United States Patent [19]

Ferrell

[11] Patent Number: 5,005,210
[45] Date of Patent: Apr. 2, 1991

[54] METHOD AND APPARATUS FOR CHARACTERIZING A RADIO TRANSMITTER

[75] Inventor: Philip J. Ferrell, Seattle, Wash.

[73] Assignee: The Boeing Company, Seattle, Wash.

[21] Appl. No.: 139,862

[22] Filed: Dec. 30, 1987

[51] Int. Cl.⁵ .............................................. H04B 17/00
[52] U.S. Cl. ........................................ 455/115; 455/9; 342/44; 345/825.34
[58] Field of Search ....................... 455/115, 67, 9, 10, 455/316, 317, 114, 63; 342/20, 44, 192, 173; 340/825.34; 364/484, 487

[56] References Cited

U.S. PATENT DOCUMENTS

| | | | |
|---|---|---|---|
| 3,649,909 | 3/1972 | Ort et al. | 455/115 |
| 4,114,136 | 9/1978 | D'Albora | 364/487 |
| 4,146,892 | 3/1979 | Overman et al. | 342/20 |
| 4,249,257 | 2/1981 | Campbell | 455/115 |
| 4,414,632 | 11/1983 | Murrell | 455/115 |
| 4,426,648 | 1/1984 | Tsui et al. | 342/20 |
| 4,455,678 | 6/1984 | McKiel, Jr. | 455/155 |
| 4,559,602 | 12/1985 | Bates, Jr. | 364/487 |
| 4,597,107 | 6/1986 | Ready et al. | 364/484 |
| 4,700,191 | 10/1987 | Manor | 342/20 |
| 4,797,931 | 1/1989 | Furukawa et al. | 364/484 |
| 4,827,259 | 5/1989 | Murphy et al. | 364/487 |
| 4,843,562 | 6/1989 | Kenyon et al. | 364/487 |

OTHER PUBLICATIONS

"Pinpointing Location of Hostile Radars"; Microwaves, Nov. 1969; Donald L. Margerum; pp. 60–64.

Primary Examiner—Douglas W. Olms
Assistant Examiner—Ralph Smith
Attorney, Agent, or Firm—Seed and Berry

[57] ABSTRACT

A method and apparatus for identifying a radio transmitter. The transient frequency or phase history of the turn-on characteristics of a transmitter is detected and digitized. The history can be analyzed by a microprocessor operating a computer program to gather transient phase information from an unknown transmitter and to classify the transmitter in accordance with a transient characteristic.

20 Claims, 11 Drawing Sheets

```
;*********************
;*                   *
;*   S.R.G's NEW REPEATER CONTROLLER   *
;*         12/22/86                    *
;*            k7pf                     *
;*                   *
;*********************
;
; This firmware is implemented as a STATE Machine. A State
; requires some external event to exit (state change). Each
; State consists of an entry point, possibly a loop containing
; a WATCH DOG timer reset, and tests to determine whether to
; remain in the state. State entry points and loop addresses
; are listed as follows:
;
; <State>       <Start Addr>   <Loop Addr>  <Description>
; IDLE          IDLEST         IDLE         no signal -
;                              attenuator at IATT, waiting for input carrier
; EVALUATE      EVALST         n/a          signal detected -
;                              gather data and evaluate user parameters
; ACTIVE        ACTIV·         ACTIV        repeater is on -
;                              checking for sub-A, DTMF etc. transmitting
; WAIT          WAITST         WAITI/N      input dropped -
;                              atten at RATT, rptr IDs or drops in STO sec
; BONEYARD      BONYST         BONYD        error condition -
;                              repeater OFF, waiting for input to clear
; PRECONTROLLER PCNST          PCNTR        command sub-A -
;                              detected. Must identify as control station
; CONTROLLER    CNTLR          CNTLR        control station -
;                              is allowed to alter repeater parameters
;
;         A/D CHANNEL ASSIGNMENT
;
;               Ch #           Selects:
BLIM    EQU     0              ;Buffered Limiter (0-5v)
ANSQ    EQU     1              ;Analog Squelch
EDET    EQU     2              ;Envelope detector (0-4v)
ESUB    EQU     3              ;CTCSS Level (HUM too)
BLSD    EQU     4              ;Level-shifted Discriminator
IDSC    EQU     5              ;Integrated version of above
BUSV    EQU     6              ;Master 14v bus voltage
TPWR    EQU     7              ;RF Power Output
;
;
        ORG     0A0H           ;ASCII ROM signature
;
        DB      'firmware by:'
        DB      'Phil Ferrell - K7PF '
        DB      'SEATTLE REPEATER CONTROLLER '
        DB      '-C- Seattle Repeater Group '
        DB      '12/22/86'
;
        ORG     100H           ;main operating pgm          ___—300
;
; carrier detected, enter EVALUATE state
;
```

FIG. 7A

```
EVALST:  LD      A,'e'           ;note..
         CALL    UART            ;..state
         XOR     A               ;attn..
         OUT     (ATTEN),A       ;..to 0                    302
         LD      IX,FBUF         ;init ptr
         CALL    FPT             ;take fingerprint
         CALL    DATIM           ;starting date/time
         CALL    EXTST           ;state + 8 a/d ch
         CALL    AMPL            ;signal strength
;
; stored fpt, date, time, A/D, & amplitude in FBUF
;
;
; THE FOLLOWING ARE SUPPORT SUBROUTINES:
;         NFP = 64 (decimal)
;
; fingerprint the transmitter - NFP supersamples
; data stored @ (IX) - AF,IX altered - others OK
;
FPT:     PUSH    HL
         PUSH    DE
         PUSH    BC
         LD      A,NFP           ;# supersamples
FPT1:    PUSH    AF              ;save same
         LD      DE,0            ;zero DE..
         LD      HL,0            ;..and HL
         LD      C,32            ;# conv/supersample
         LD      A,BLSD          ;throwaway..
         CALL    A2D             ;..conversion
FPT2:    LD      A,BLSD          ;select BDSC channel..
         CALL    A2D             ;..and get value
         LD      E,A
         ADD     HL,DE           ;accumulate
         DEC     C               ;supersample done?
         JR      NZ,FPT2         ;no
         ADD     HL,HL           ;yes, normalize..
         ADD     HL,HL           ;in reg H
         ADD     HL,HL
         LD      (IX+0),H        ;save supersample
         INC     IX
         OUT     (WDOG),A
         POP     AF
         DEC     A               ;done yet?
         JR      NZ,FPT1         ;no, do next
         POP     BC
         POP     DE
         POP     HL
         RET
;
;
; A/D conversion - runs in 100/200 uS
; (enter with desired channel# in A reg)              304
;
DA2D:    PUSH    AF              ;double setup..
         CALL    A2D             ;..A/D call
         POP     AF
```

FIG. 7B

```
A2D:    OUT     (ATOD),A        ;sel ch# & start cnv
        PUSH    BC
        LD      B,8             ;wait for..
        DJNZ    $               ;..a/d busy
        LD      B,8             ;EOC wait limit
A2D1:   IN      A,(EIDSC)       ;status
        AND     10H             ;cnv done?
        JR      NZ,A2D2         ;yes
        DJNZ    A2D1
A2D2:   POP     BC
        IN      A,(ATOD)        ;get val
        RET
;
; sends a single fingerprint starting at at IX
;
SFPT:   PUSH    BC
        LD      A,(EISTO)       ;select..           ~306
        AND     0F0H            ;..only
        OR      98H             ;..binary
        OUT     (EIDSC),A       ;..audio
        LD      B,8
SFPT1:  LD      A,CSYN
        CALL    UART            ;send sync
        DJNZ    SFPT1
        LD      A,TSYN          ;last sync..
        CALL    UART            ;..byte
        LD      B,NFP+19        ;follow with..
SFPT2:  LD      A,(IX+0)        ;..fingerprint, 6
        CALL    UART            ;..bytes of date/time
        INC     IX              ;..10 bytes of status
        DJNZ    SFPT2           ;..3 bytes of endtime
        LD      A,CR            ;..end it with a
        CALL    UART            ;..carriage return
        LD      A,(EISTO)       ;restore..
        OUT     (EIDSC),A       ;..EIDSC
        POP     BC
        RET
;
; dump up to 254 fingerprints from FPST          ~308
;
DFPT:   LD      A,90H           ;rptr carrier..
        OUT     (EIDSC),A       ;..ON
        LD      (EISTO),A
        LD      A,12H           ;'data trans'..
        CALL    TVSP            ;..voice msg
        LD      A,5             ;wait half..
        CALL    HMS             ;..a sec
        LD      HL,FPST         ;set pointer
        LD      DE,80H          ;set spacing
DFPT1:  LD      A,(HL)          ;get 1st byte
        OR      A               ;zero?
        JR      Z,DFPT2         ;empty, skip
        PUSH    HL              ;not empty
```

FIG. 7C

```
            POP     IX              ;set pointer..
            CALL    SFPT            ;..and send
            LD      B,0             ;wait
            DJNZ    $
DFPT2:      ADD     HL,DE           ;point to next
            LD      A,H             ;done?
            INC     A               ;was H=FF?
            JR      NZ,DFPT1        ;no, next
            LD      A,5             ;yes, done
            CALL    HMS             ;wait half sec
            LD      A,16H           ;'complete'..
            CALL    TVSP            ;..voice msg
            JP      KILRP           ;call + ret
;
; fingerprint to FPST pushdown storage buffer
;
PFPT:       PUSH    BC
            PUSH    DE              ;save reg
            PUSH    HL
            LD      HL,FPST+80H     ;move current..
            LD      DE,FPST         ;..fingerprint
            LD      BC,SSIZ         ;..into large
            LDIR                    ;..buffer
            POP     HL
            POP     DE              ;restore reg
            POP     BC
            RET
;
; clear the FPST storage area
;
ZFPT:       LD      HL,FPST         ;zero the..
            LD      DE,FPST+1       ;..FPST
            LD      BC,SSIZ-1       ;..storage
            LD      (HL),0          ;..buffer
            LDIR
            RET
;
;
;
            END
```

FIG. 7D

METHOD AND APPARATUS FOR CHARACTERIZING A RADIO TRANSMITTER

TECHNICAL FIELD

This invention relates to a method and apparatus for characterizing a radio transmitter, and more particularly, to a method and apparatus for characterizing a radio transmitter based on its transient turn-on and/or turn-off characteristics.

BACKGROUND ART

In many situations, radio transmitters are identified by special identification codes. These codes are typically transmitted with the other communications a transmitter is sending. In many other situations, however, there is interest in identifying transmitters that are not deliberately identified. For example, it can be useful to have an apparatus and means for identifying radio transmitters that are operating clandestinely or in such a manner as to interfere with the transmissions of others.

Previous attempts to characterize radio transmitters have been based on using the signal amplitude of the transmitter as a function of time. Amplitude-based techniques, however, are susceptible to multipath propagation and path loss. These transmission phenomena can distort the received signal amplitude independently of any transmitter characteristics. Time-history amplitude characterization is also typically used on a transmitter which is already operating and is, therefore, fully warmed up. A warmed-up transmitter is relatively stable and is, accordingly, more difficult to characterize.

It has been determined that the phase or frequency (i.e., time rate of change of phase) response of a transmitter is essentially insensitive to some forms of multipath and path-loss propagation problems that plague amplitude-based signal characterization techniques.

It is therefore desirable to have a method and apparatus for characterizing a radio transmitter that is based on the transient phase history of the transmitter as it is being turned on.

DISCLOSURE OF THE INVENTION

It is an object of the present invention to provide a method and apparatus for characterizing a transmitter when it is turning on.

It is another object of the present invention to provide a method for identifying a transmitter based on its turn-on characteristics.

According of one aspect, the invention includes an apparatus for characterizing a radio transmitter that transmits a transient signal. The apparatus comprises means for receiving the transient signal transmitted by the transmitter, means for measuring a parameter of the transient signal, and means for analyzing the transient signal parameter to determine transient characteristics of the radio transmitter.

In another aspect, the invention includes a method for characterizing a radio transmitter that transmits a transient signal. The method comprises the steps of (a) receiving the transient signal transmitted by the transmitter for a period of time, (b) measuring a parameter of the transient signal, and (c) analyzing the transient signal parameter to determine transient characteristics of the radio transmitter.

BRIEF DESCRIPTION OF THE DRAWINGS

FIG. 1 is a state diagram of the operation of an apparatus for characterizing a radio transmitter during its turn-on.

FIG. 2 is a block diagram of an apparatus for characterizing a radio transmitter during its turn-on.

FIG. 5 is a schematic diagram of a master processor input/output portion of the apparatus whose detailed block diagram is shown in FIG. 3.

FIGS. 7A through 7D are a listing of a computer program that operates in connection with a microprocessor that is part of the apparatus for characterizing the radio transmitter as shown in FIG. 3.

FIG. 8 is a graph of a typical radio transmitter fingerprint generated by the method and apparatus of the invention.

BEST MODE FOR CARRYING OUT THE INVENTION

The method and apparatus of the present invention operate to characterize the transient turn-on characteristics of a radio transmitter that is intended to be operated at a predetermined frequency. While the radio transmitter will typically operate at an assigned frequency, the present invention only requires that the transmitter's frequency be known a priori. Briefly, the method and apparatus operate to determine the phase (or phase rate of change) history of the radio transmitter's transient turn-on characteristic. If desired, the method and apparatus additionally operate to analyze the phase (or phase rate of change) history in order to specify a few characterizing parameters. Clearly, once a number of such phase or phase rate-of-change histories and/or collections of characterizing parameters have been established, the method and apparatus of the invention can be used to identify transmitters whose characteristics have already been put in the library and to distinguish new transmitters whose characteristics have not been placed in the library.

Figure 1:
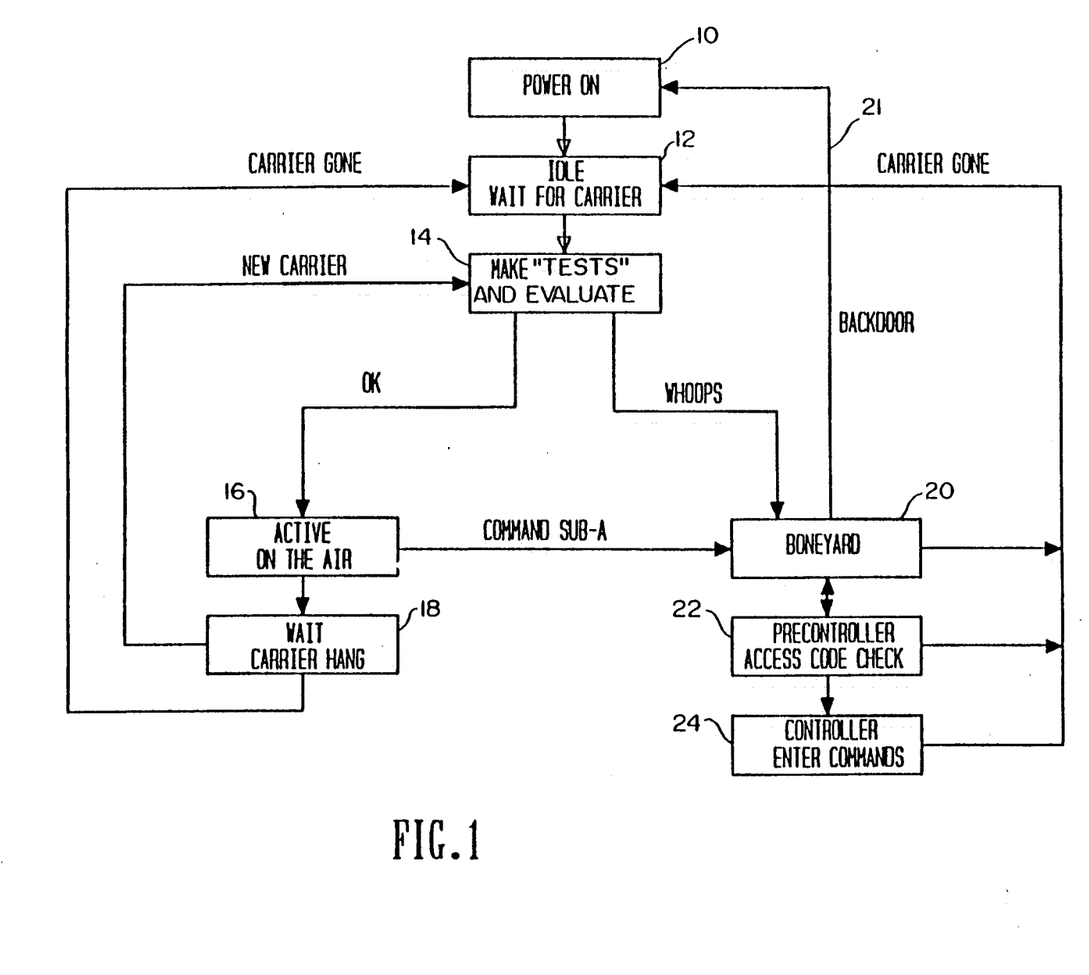

An overview of the operation of the invention is provided in the state diagram of FIG. 1. When power is first supplied to the system, it enters the "power on" state 10. In this state, the system initializes itself by, for example, loading a computer program into a microprocessor that controls the remaining components of the system. After the system has initialized itself, it enters the "idle" state 12, where it waits for the occurrence of a carrier frequency in the radio frequency (RF) band of interest. The presence of a carrier frequency indicates that a transmitter whose turn-on transient should be characterized is in operation. When the system detects a carrier frequency, it enters the "evaluate" state 14. In the "evaluate" state, the system gathers the transient turn-on data of the operating transmitter. It also performs tests to characterize the turn-on transient of the operating transmitter.

In some embodiments, the system can operate as part of a repeater station and perform tests on the resulting characteristics to determine whether or not the transmitter should be allowed access to the repeater station. In the case that the operating transmitter has characteristics that are associated with a transmitter that should be allowed access to the system, the system enters the "active" state 16. While in the "active" state, the system determines whether the carrier frequency is being modulated (i.e., whether the transmitter is being used to communicate).

As long as the transmitter is being used to communicate, the system remains in the "active" state 16. However, when carrier frequency modulation ceases, the system enters the "wait" state 18. It stays in the "wait" state for a predetermined period of time (e.g., four seconds). If, by the end of this period of time, no carrier frequency is present, the system reenters the "idle" state 12. In this state, the system waits to detect the next occurrence of the carrier frequency. If, instead, the system detects a new carrier frequency, it reenters the "evaluate" state 14. In the "evaluate" state 14, the system again gathers data concerning the turn-on transient of the transmitter whose new carrier frequency has been detected and performs the other tests associated with the "evaluate" state 14.

If, during its operation in the "active" state 16, the system determines that the transmitter whose carrier frequency is being sensed is using a subaudible frequency, the system enters the "boneyard" state 20. The transition from the "active" state 16 to the "boneyard" state 20 occurs because transmitters operating with a subaudible tone can be incorrectly characterized as transmitters that should be allowed access to the repeater. The transition to the "boneyard" state 20 denies access to such transmitters.

The "boneyard" state 20 can also be entered directly from the "evaluate" state 14. This is the case if the transmitter whose turn-on transients are analyzed in the "evaluate" state 14 does not exhibit the characteristics of a transmitter authorized to use the repeater system.

The most typical way to leave the "boneyard" state 20 is to have a termination of the carrier frequency that was detected when the system was in the "idle" state 12. When the carrier frequency disappears, the system reenters the "idle" state 12, where it waits for the next occurrence of a carrier frequency in the proper frequency band. The system can also leave the "boneyard" state 20 through a back door path 21, such as by turning off the power to the system.

Less frequently, transmitters whose transient turn-on characteristics have caused the system to enter "boneyard" state 20 will have them further analyzed in the "pre-controller" state 22. In this state, the transmissions of the presently operating transmitter are checked to determine whether they contain one of a number of predetermined access codes. If the access code is not present, the system reenters the "boneyard" state 20. If, on the other hand, the access code is present, the system enters the "controller" state 24. In this state, the system is receptive to commands received from the transmitter. These commands can control the system operation and, for example, can be used to reprogram the microprocessor which is controlling the characterizing system is. If, at any time while the system in states 20, 22, or 24, the carrier frequency stops, the system will reenter the "idle" state 12.

Figures 2, 8:
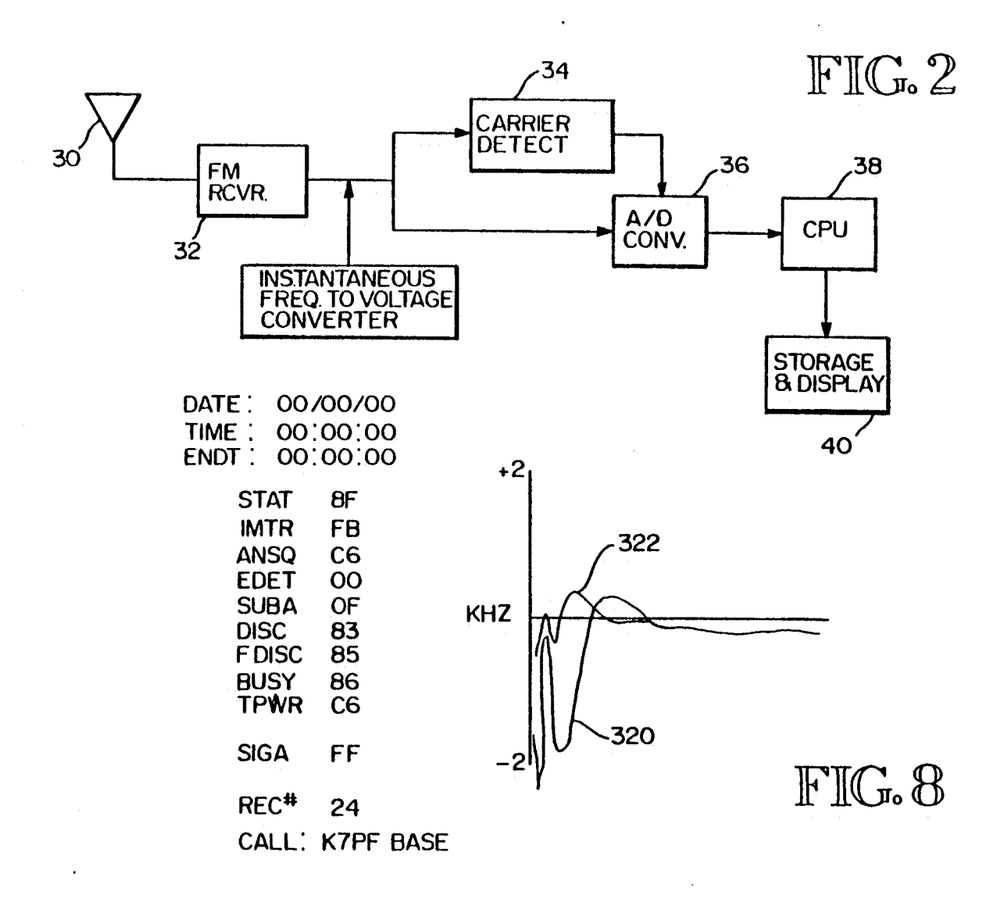
Figure 2D:
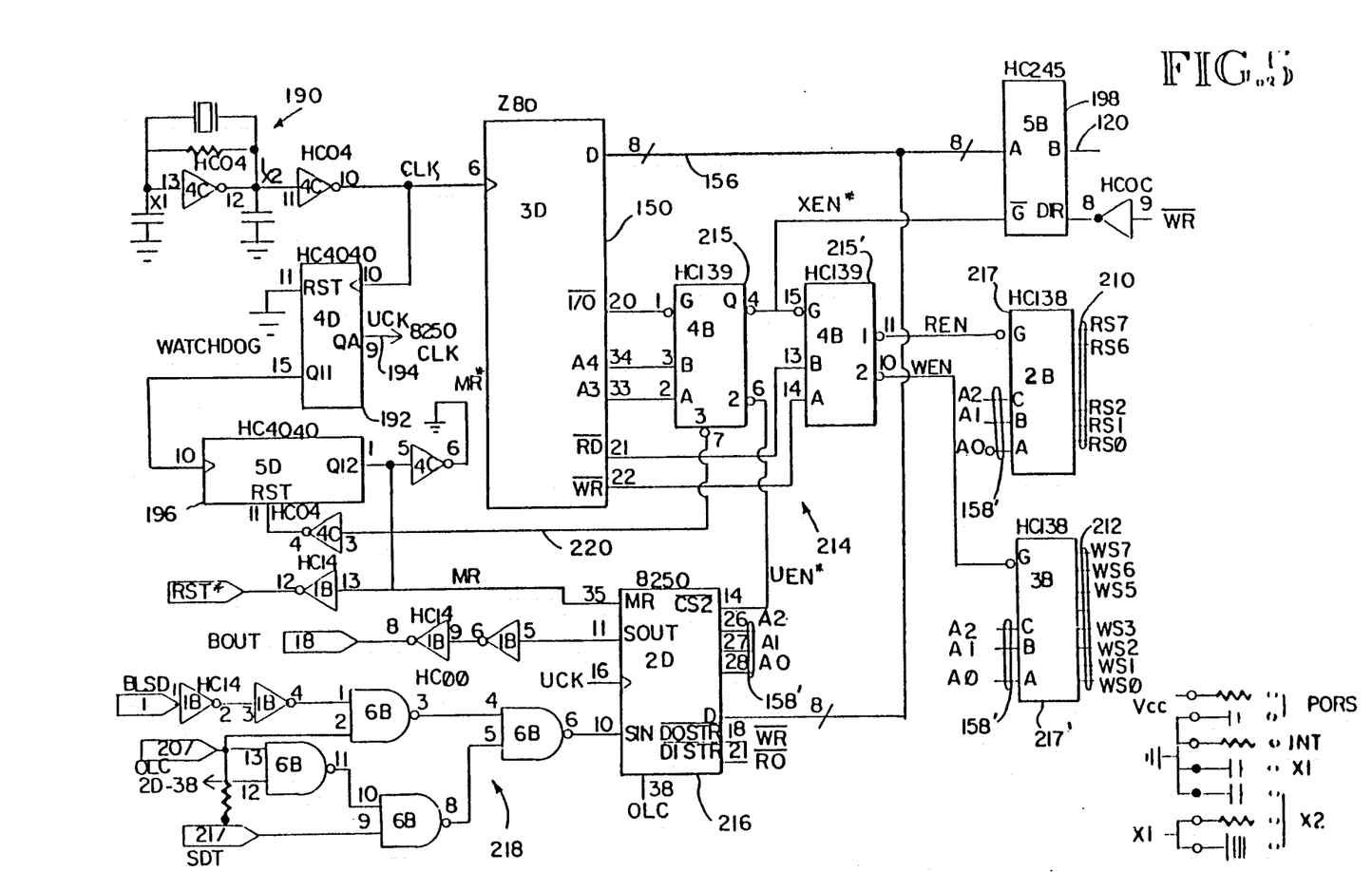

FIG. 2 is a block diagram of one embodiment of the transmitter characterizing system of the present invention. The system contains a receiving antenna 30 which can operate at the predetermined carrier frequency. The antenna 30 has sufficient bandwidth to characterize a transmitter that does not turn on precisely at the predetermined carrier frequency. The signal from the receiving antenna 30 goes to an FM receiver 32 that converts the instantaneous frequency of the transmitter to a voltage. This voltage is passed to a carrier detect circuit 34 and an analog-to-digital (A/D) converter 36.

The A/D converter 36 also receives a start signal from the carrier detect circuit 34. The carrier detect circuit 34 produces the start signal when it detects a radio frequency (RF) carrier. This means that the transmitter whose transmissions are being received by the receiving antenna 30 is operating sufficiently close to the predetermined carrier frequency to be of potential interest to the system.

Upon receiving the start signal from the carrier detect circuit 34, the A/D converter 36 samples the voltage representing the instantaneous frequency produced by the transmitter. It has been found that for a carrier frequency of approximately 147 MHz, the A/D converter will operate satisfactorily if it samples at a rate of 10 kHz. The samples produced by the A/D converter 36 are passed to the central processing unit (CPU) 38 of the microprocessor included in the characterizing system. The signal samples received by the CPU 38 are processed according to a program and the results passed to a storage and display device 40, where they can be presented for possible interpretation by a human operator.

Figure 3:
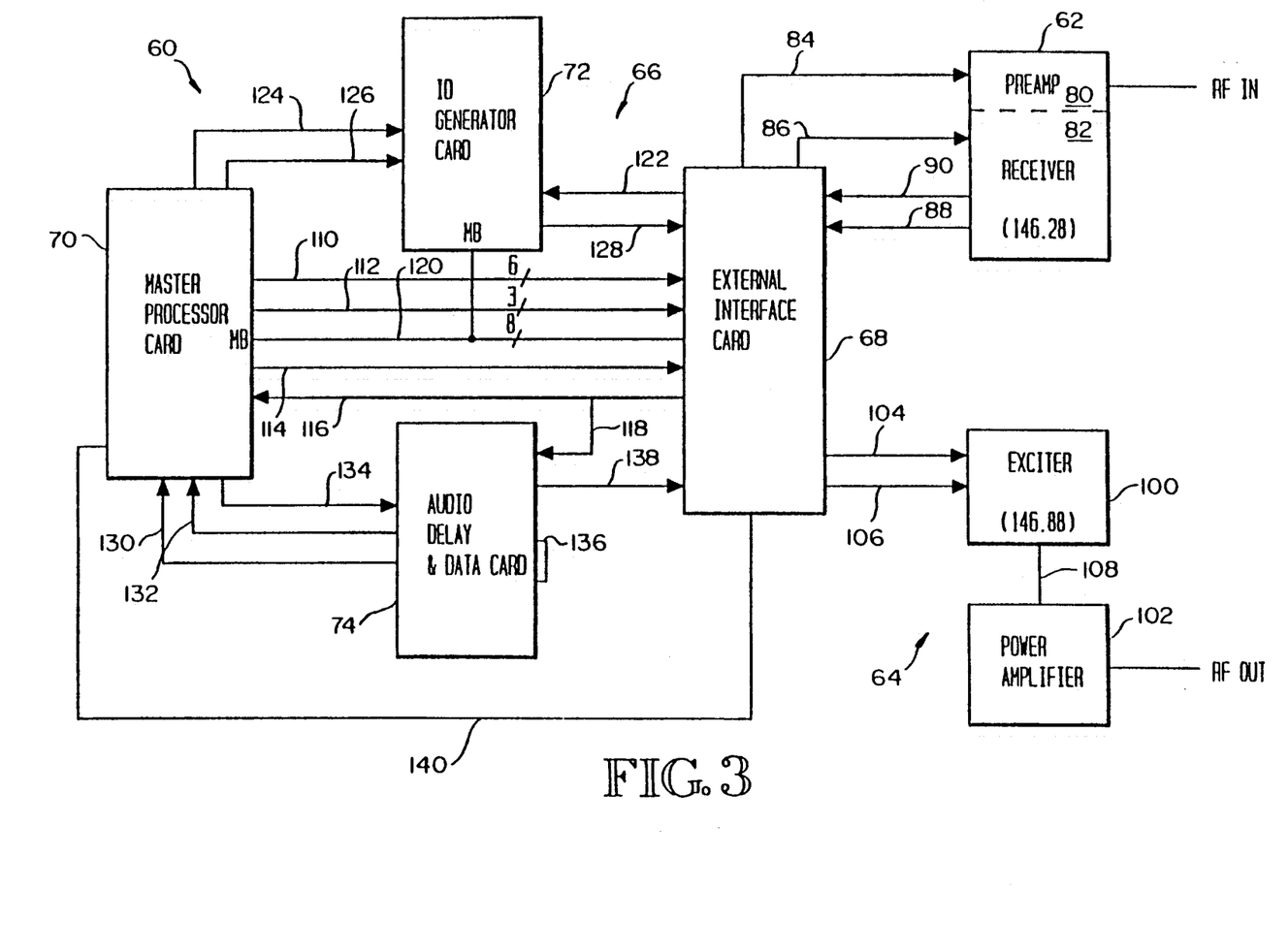
FIG. 3 is a detailed block diagram of one embodiment which includes the apparatus of FIG. 2.

FIG. 3 is a detailed block diagram of an embodiment of the present invention as incorporated into a transmission repeater system. The repeater system 60 includes a VHF-FM receiver 62, an output system 64, and controlling circuitry 66 connected between the receiver 62 and the output system 64. The controlling circuitry 66 includes an external interface card 68 that receives and transmits signals to and from the FM receiver 62. It also sends signals to the output system 64. The external interface card interacts with other circuits in the controlling circuitry 66. These circuits are found on the master processor card 70, the identification (ID) generator card 72, and the audio delay and data card 74.

The FM receiver 62, which, for example, operates at 146.28 MHz, includes a preamplifier section 80 and a receiver section 82. The preamplifier 80 receives the radio frequency (RF) input signals from the receiving antenna 30 (see FIG. 2), amplifies the RF input signals, demodulates them, and passes them to the receiver section 82. The FM receiver 62 receives its electrical power through the external interface card 68 on power line 84.

The receiver section 82 includes a PIN attenuator which is controlled by a control signal transmitted by the external interface card 68 on control line 86. The receiver section 82 produces both a discriminator signal and a limiter signal which it sends on signal lines 88 and 90, respectively. The discriminator signal is a voltage which represents the instantaneous frequency produced by the transmitter whose signal is received by the FM receiver 62 through the receiving antenna 30. The limiter signal is produced by the receiver section 82 to indicate a nonlinear measure of input signal amplitude. In response, circuitry of the external interface card 68 can produce a PIN attenuator signal on the control line 86. This signal causes the receiver section 82 to change the attenuation that it applies to the signal that it receives from the amplifier section 80.

The output system 64 includes an exciter 100 (for example, operating at 146.88 MHz) and a power amplifier 102. The RF output signal produced by the power amplifier 102 is sent to an antenna for transmission of a repetition of a screened version of the transmitter signal received by the repeater system 60. The exciter 100 receives both its power and an audio signal (on lines 104 and 106, respectively) from the external interface card 68. The carrier frequency of the exciter 100 is frequency modulated (FM'd) by the audio signal and passed to the power amplifier 102 over the line 108. The power amplifier 102 amplifies the FM signal to produce the RF output signal.

The external interface card 68 receives signals from the master processor card 70 over the write I/O and read I/O strobe lines 110 and 112, respectively, as well as a binary audio signal on the signal line 114. Both the master processor card 70 and the audio delay and data card 74 receive a buffered audio signal from the discriminator of the receiver section 82 through the external interface card 68. These signals are carried by the lines 116 and 118, respectively. The external interface card 68, the master processor card 70, and the ID generator card 72 intercommunicate on the eight-bit master bus 120.

The ID generator card 72 receives electrical power from the external interface card 68 on the power line 122. It also receives read data and write command signals from the master processor card 70 on lines 124 and 126, respectively. When the ID generator card 72 receives a read data signal over line 124, it reads data transmitted from the master processor 70 over the master bus 120. When the ID generator card 72 receives a write signal command on line 126, it produces an ID audio signal that is transmitted to the external interface card 68 over the line 128. Accordingly, the master processor card 70 can cause the ID generator card 72 to periodically send ID audio signals to the external interface card 68 for transmission by the output system 64.

The master processor card 70 receives serial data and select data terminal signals from the audio delay and data card 74 on lines 130 and 132, respectively. The master processor card sends a binary audio signal to the audio delay and data card 74 on line 134. The audio delay and data card 74 also receives input signals through an RS 232 terminal connection 136, which can be connected to an input/output device, such as a keyboard. The audio delay and data card 74 sends a delayed audio signal on line 138 to the external interface card 68 for transmission by the output system 64.

Through this circuitry, the repeater system 60 can receive a signal from a transmitter, analyze the signal, and send a delayed version of the audio signal contained in the received transmission if the transmitter originating the audio signals has appropriate characteristics. In addition, the repeater system 60 can periodically insert ID signals of its own, when it is not being used to repeat authorized signals it receives. As a safety precaution, the master processor card 70 can also send a watchdog timer reset signal to the external interface card 68 on the line 140. Master processor card 70 can send such a signal when the program fails to reset the watchdog timer, since such a failure can jeopardize the safe operation of the repeater system 60, which is generally located remotely.

Figure 4:
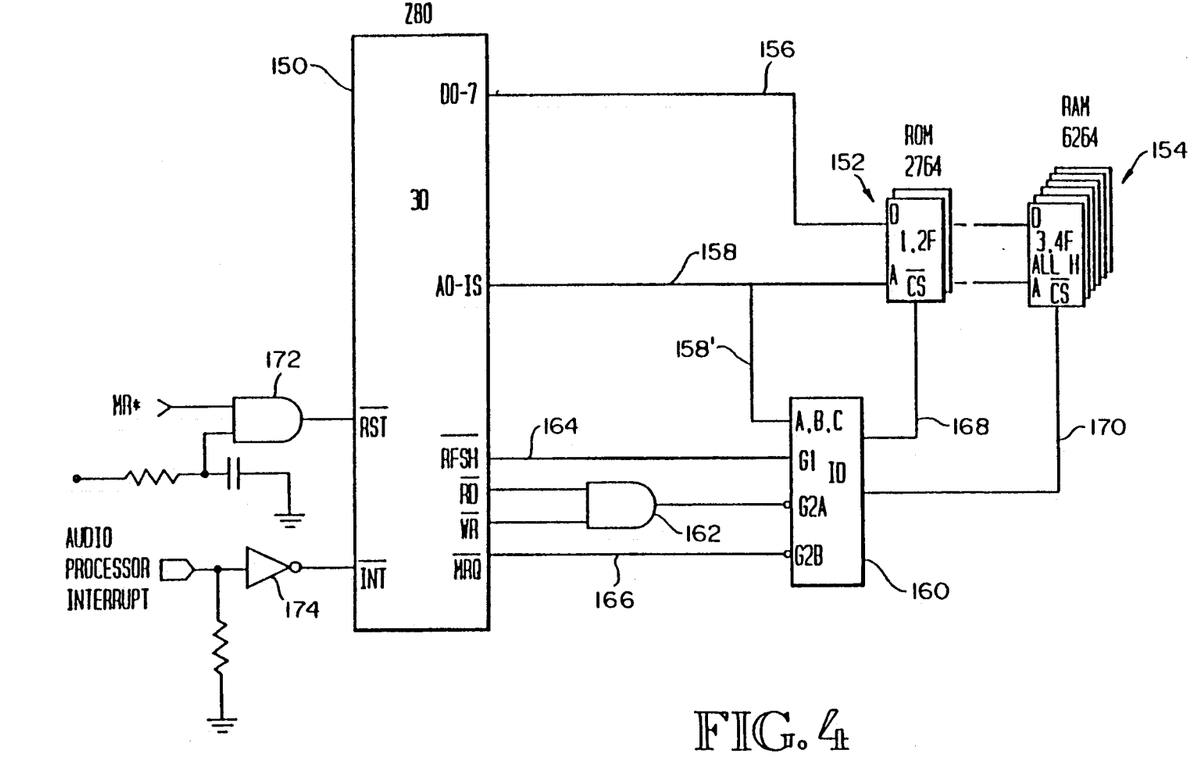
FIG. 4 is a schematic diagram of a memory portion of the apparatus whose detailed block diagram is shown in FIG. 3.

Turning now to the schematic diagram of the memory portion of the master processor card 70 shown in FIG. 4, it can be seen that the microprocessor 150 (for example, a Z80, manufactured by Zilog Incorporated) is connected to read-only memory (ROM) 152 and random access memory (RAM) 154. The ROM 152 and RAM 154 communicate data with the microprocessor 150 over the eight-bit data bus 156. The microprocessor specifies addresses to the ROM 152 and RAM 154 by means of sixteen-bit address bus 158. Thirteen bits of the sixteen-bit address bus pass directly to the ROM 152 and the RAM 154, while the remaining three bits are sent to the decode circuitry 160.

Whether the ROM 152 and the RAM 154 are to be read or written to is specified by the binary status on the RD* and WR* signals produced by the microprocessor 150. These signals are combined in OR gate 162 and received by the decode circuitry 160, along with the refresh (RFSH*) and memory request (MRQ*) signals on lines 164 and 166, respectively. Decode circuitry 160 sends a two-bit signal to the ROM 152 on line 168 and a six-bit signal to the RAM 154 on the line 170.

At initialization, in the "power on" state 10 (FIG. 1), the program contained by the ROM 152 is sent to a program memory (not shown) over the data bus 156 in response to address and card select signals. The address is placed on the address bus 158 and the card select signal is produced on the signal line 168 by the decode circuitry 160. Subsequently, data are written or read from the RAM 154 over the data bus 156 in response to addresses on the address bus 158 and under the control of signals produced on the signal lines 170 by the decode circuitry 160.

The microprocessor 150 can be reset when an appropriate signal is received on the reset (RST*) line through the OR gate 172. Similarly, the operation of the microprocessor 150 can be interrupted by the presence of the proper signal on the interrupt (INT*) port of the microprocessor 150, as transmitted by the amplifier 174.

The I/O activity of the microprocessor 150 is controlled by the I/O circuitry shown in FIG. 5. A 4 MHz clock signal is produced by clock circuit 190 and presented to the microprocessor 150 and the watchdog circuit, which includes counter 192. The counter 192 is operating as a divide-by-two frequency divider which produces a 2 MHz clock on signal line 194 and sends a signal on to the counter circuit 196. Counter circuit 196 is also part of the watchdog circuit. The data produced by the microprocessor 150 on the data bus 156 are received by the bidirectional data buffer 198, which is connected to the master bus 120. The I/O read and write strobe signals 210 and 212, respectively, are produced under the control of I/O circuitry 214 and the least significant three bits of the address bus 158 (designated 158').

The I/O circuitry 214 consists of two two-to-four decoder chips (such as HC139s) 215 and 215'. Chip 215 receives address data from address lines A3 and A4 of the microprocessor 150 and produces X-enable (XEN*) and UART-enable (UEN*) signals. These signals are respectively sent to the bidirectional data buffer 198 and the universal asynchronous receiver/transmitter (UART) chip 216 (such as an 8250). Chip 215' receives read/write signals from the RD* and WR* ports of the microprocessor 150 and produces read enable (REN*) and write enable (WEN*) signals. These signals are respectively sent to the three-to-eight decoder chips (such as HC138s) 217 and 217'. The decoder chips 217 and 217' respectively produce the I/O read and write strobe signals 210 and 212.

The UART chip 216 also receives signals from the data bus 156, the least three significant bits of the address bus 158', and the output of logic circuitry 218. The logic circuit 218 produces an input signal of serial data to UART 216 as a function of the buffered level-shifted discriminator (BLSD) frequency-shift keyed (FSK) output of the receiver section 82 of the FM receiver 62 (see FIG. 3).

The decoder chip 215 also produces a reset counter signal which is sent periodically (e.g., once per second) over line 220 to the counter circuit 196 of the watchdog circuit. If the microprocessor 150 is determined to be inoperative as a result of no detected I/O activity on decoder chip 215, the watchdog circuit produces a microprocessor reset (MR*) signal. The MR* signal is sent to the OR gate 172 (see FIG. 4) to reset the microprocessor 150.

Figure 6:
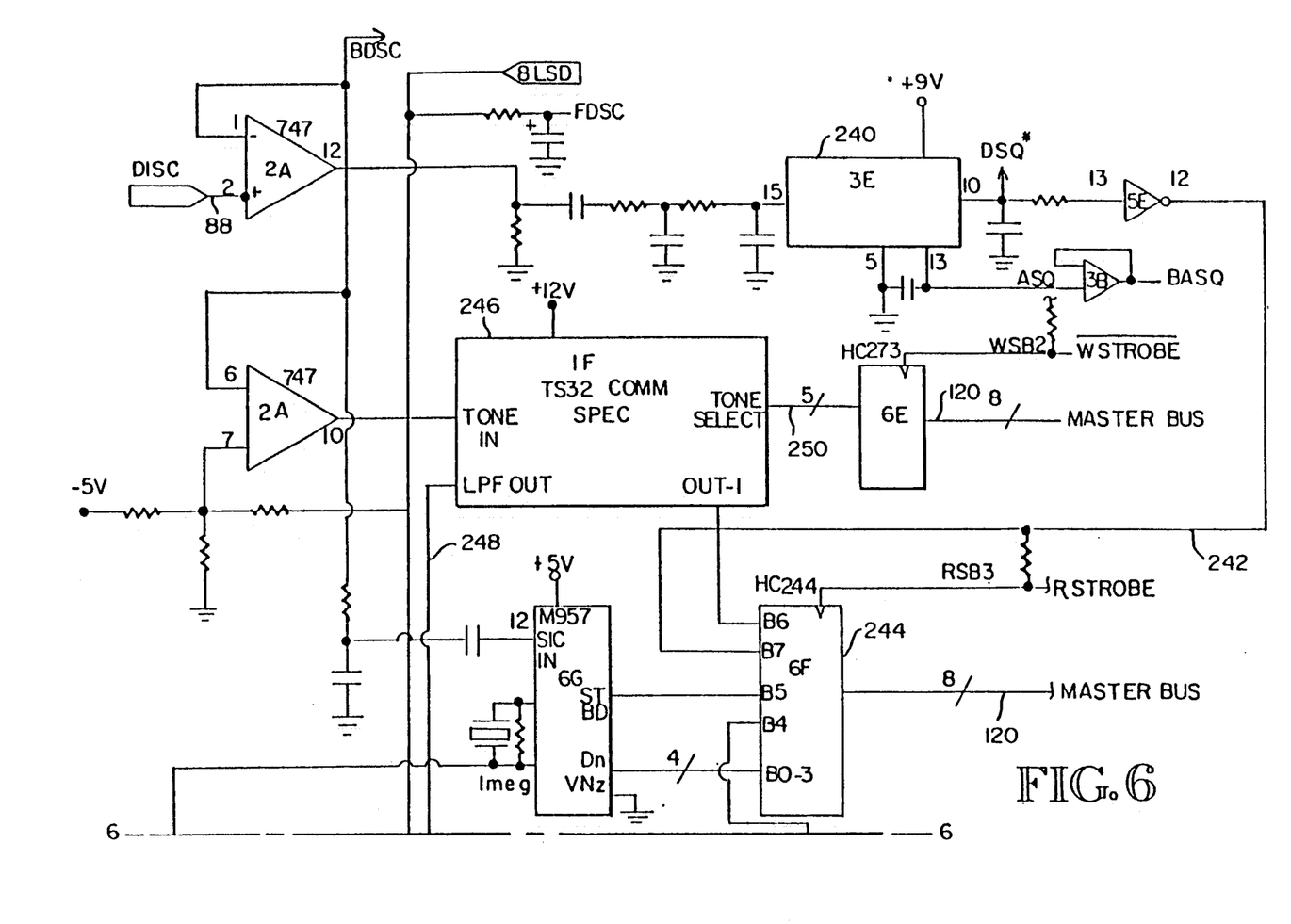
FIG. 6 is a schematic diagram of the external interface portion of the apparatus whose detailed block diagram is shown in FIG. 3.

FIG. 6 is a schematic diagram of the external interface card 68. Interface card 68 receives the output of the discriminator of the receiver section 82 of the receiver 62, detects the presence of a carrier signal, and thereafter, causes the discriminator signal to be converted to digital form. The discriminator signal is received on line 88 and sent to the squelch circuit 240. The squelch circuit 240 can be a Motorola Micor M6709, which produces a digital signal when its input contains a specified carrier-to-noise ratio. The output signal (DSQ*) of the squelch circuit 240 is carried on signal line 242 to signal buffer 244.

The discriminator signal is also sent to the subaudible detector 246, which produces a subaudible tone detect signal on signal line 248 if a subaudible tone is detected in the discriminator output. The subaudible detector 246 can be set to search for any of thirty-two specific subaudible tones. The tone is specified by a digital signal on the five-bit parallel tone select signal line 250. The five bits are received from master bus 120. This feature is used when the system is in the precontroller state 22 (see FIG. 1), in which it is desired to determine whether an authorized subaudible tone is being detected in the discriminator output.

The discriminator signal is also sent to the A/D converter 260, which operates at a sampling rate significantly higher than the highest frequency of interest in the discriminator output. It has been determined that a 10 kHz sampling rate is appropriate for this purpose. The digital output signal produced by the A/D converter 260 is placed on the eight-bit master bus 120. Other signals digitized by the A/D converter 260 include a detected envelope of the subaudible signal produced by the subaudible detector 246 and an envelope of the discriminator output.

Referring to FIGS. 7A-7D, the program represented exists as firmware on the ROM 152 (see FIG. 4). The outputs from the A/D converter 260 are received by the microprocessor 150 and subjected to a digital low-pass filter operation by the program controlling the microprocessor 150. It has been determined that a grouping of 32 consecutive samples provides an adequate representation of the low-frequency components of the discriminator output signal. However, if desired, the number of points averaged can be changed. If the number of points averaged is reduced, the resulting output signal will have a higher frequency content.

When the program has determined that a carrier signal has been detected, it enters the "evaluate" state 14 (see FIG. 1) at program line 300. In the "evaluate" state 14, the program causes the transient history (or "fingerprint") to be taken at program line 302, under the control of a subroutine FPT. The program also takes other data, such as the date and time and a measure of the signal strength. These data are stored in the RAM that is resident on the microprocessor 150.

Figure 7B:
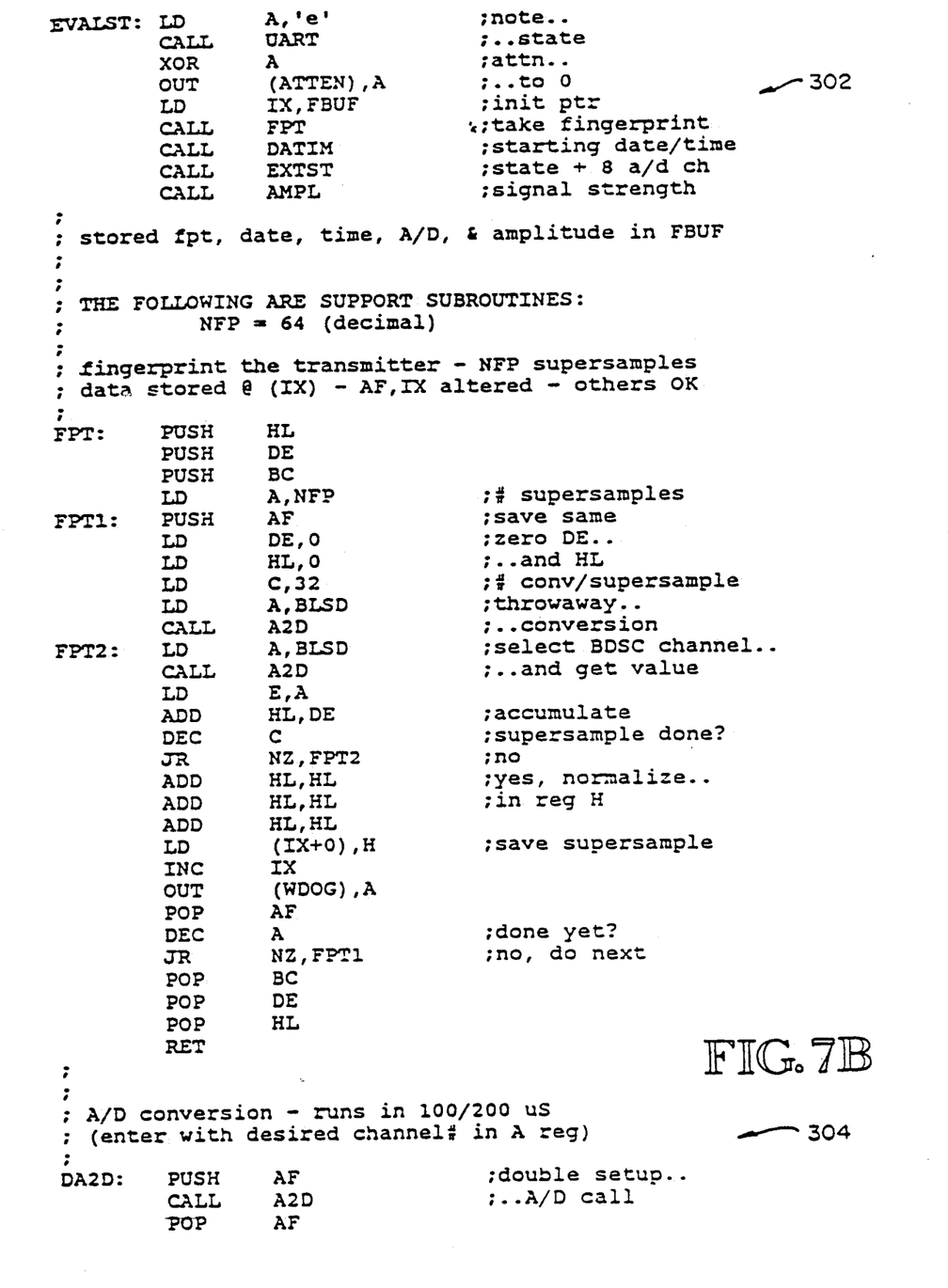
Figure 7C:
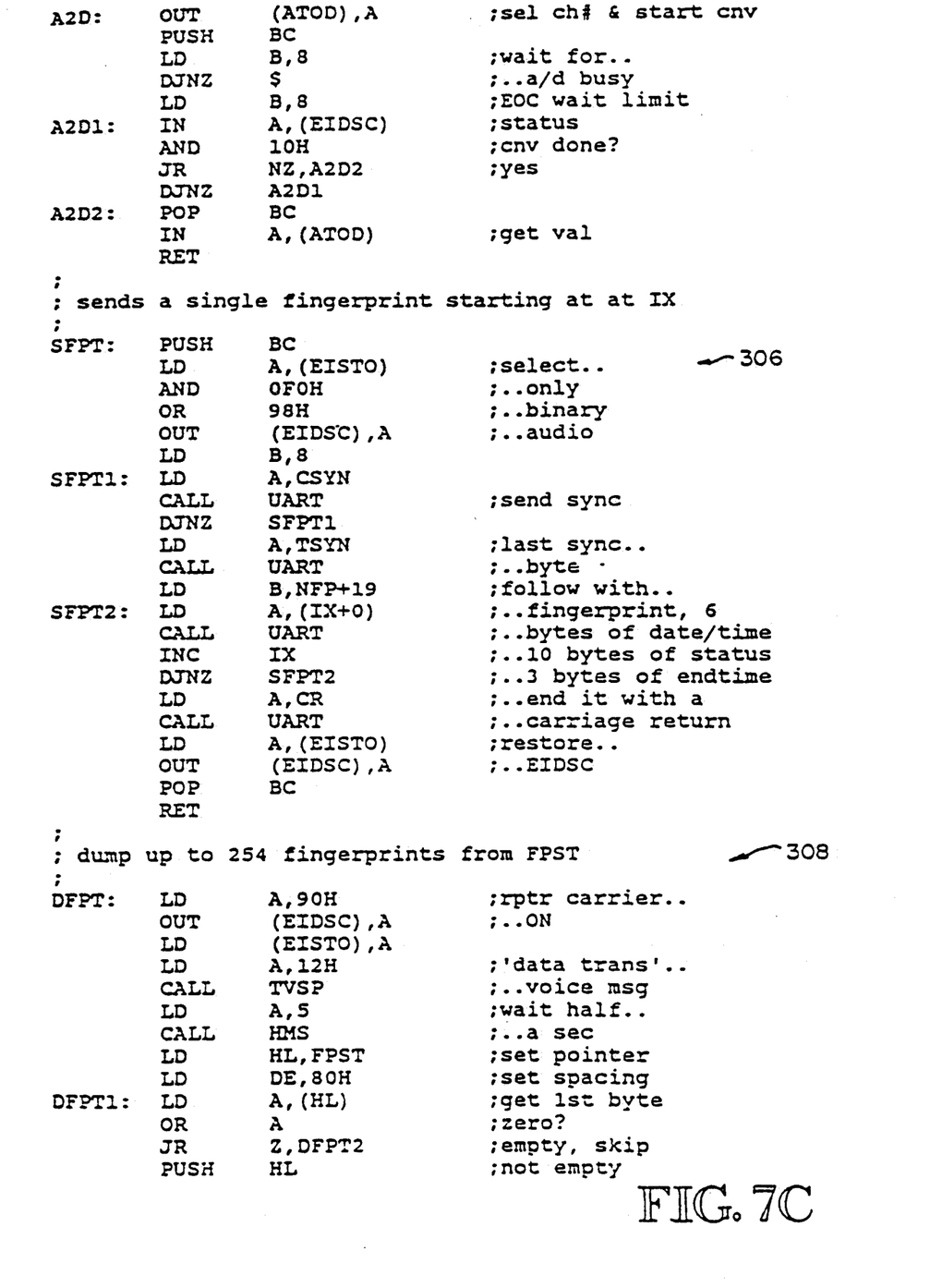
Figure 7D:
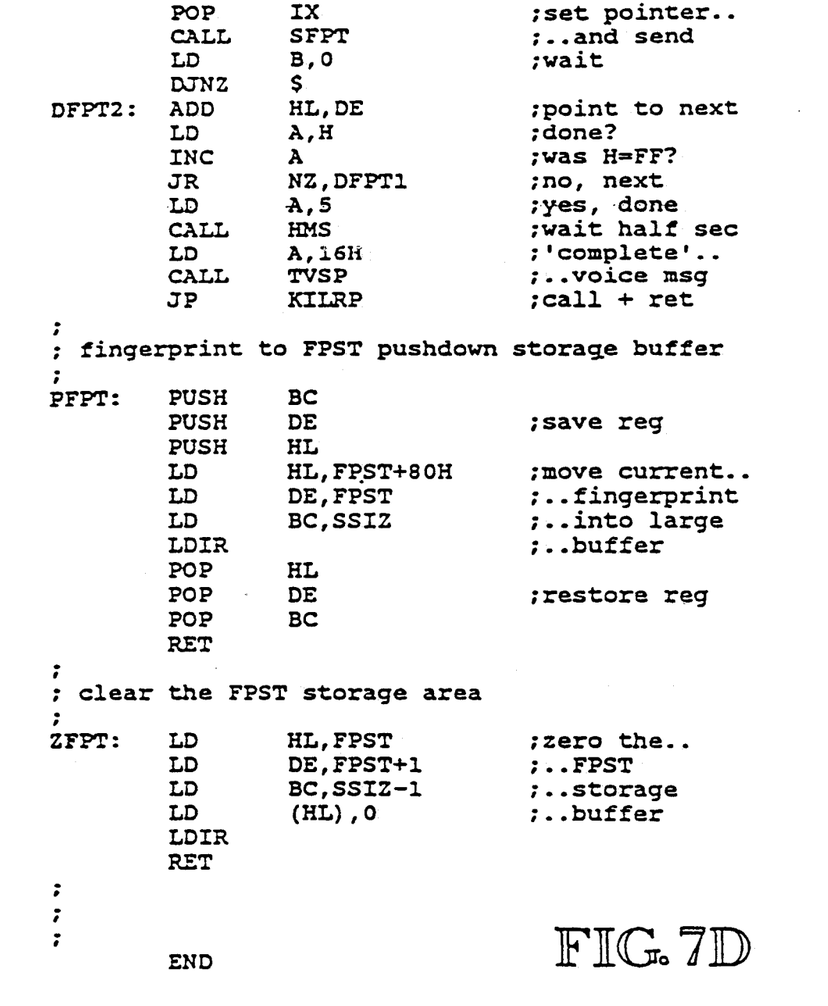

The FPT subroutine makes calls to the A/D conversion subroutine at program line 304. The program is also capable of sending a single fingerprint or a number of fingerprints, as determined by subroutines SFPT and DFPT, which start at program lines 306 and 308, respectively.

FIG. 8 is a graph of a typical radio transmitter fingerprint generated by the method and apparatus of the invention. The graph can be printed out by a printer connected to the terminal connection 136 operating, for example, as an RS 232 port under the control of a program running in the microprocessor 150 (see FIG. 3). The abscissa of the graph in FIG. 8 has the dimensions of time and begins with the first sample taken after the transmitter was operating in the frequency band of interest. It has been found that, for most transmitters operating at very high and ultrahigh frequencies (VHF and UHF, respectively), two hundred milliseconds of sampled transient turn-on data is sufficient to provide a unique transmitter characterization. The ordinate of the graph in FIG. 8 is frequency deviation from the center of the frequency band of interest. As shown in FIG. 8, the frequency deviation can be plus or minus approximately 2 kHz for transmitters operating in the 147 MHz frequency band.

In addition to other data, such as date, starting and ending times, and various signal levels, the graph of FIG. 8 shows deviations of the transient turn-on data from the center of the frequency band (curve 320) and a derivative curve 322 representing the approximate derivative of the transient turn-on data curve 320. The frequency deviation data are typically sampled at a 10 kHz rate, i.e., every 0.1 millisecond. Therefore, for presentation purposes, the data can be represented by an average of consecutive data points. The data in FIG. 8 have been averaged in groups of 32 points, so that the time interval between consecutive points in FIG. 8 is approximately 3.2 milliseconds. The curve 320 shown in the typical graph of FIG. 8 has an initial transient portion followed by a steady-state portion, where the transmitter has asymptotically reached its final frequency.

The transient turn-on data curve 320 presents a fingerprint of a transmitter that is highly repetitive for a given transmitter and readily distinguishes between two transmitters. This technique, for example, has been found to easily distinguish between two models of the same transmitter. In those cases where the turn-on transient data of two transmitters have a resemblance, they can then be distinguished on the basis of the derivative curve 322. This curve is an approximation to the derivative of the transient turn-on data curve, and is calculated by taking the difference between consecutive points of the curve 320.

While it has been found that a human being can easily distinguish a transmitter based on its turn-on transient characteristics, the identification task can be automated by applying appropriate pattern recognition techniques to the curves 320. This automation will allow a larger number of transmitters to be identified and will allow the identification to be done more quickly. In some cases, it can be convenient to characterize the turn-on transients of various identifiable transmitters in terms of a small number of parameters. These parameters can be determined by data analysis of the curves 320. One example of parameters that may be useful for characterization purposes are the fundamental frequency of the transient response, its damping rate, and the final frequency of the transient. The final frequency can also be determined from the discriminator output of the system described. The techniques for deriving these parameters are well-known to those skilled in the art.

While one specific embodiment of the present invention has been described in the foregoing, it will be clear to those who are skilled in the art that various modifications of the present invention can be made without departing from its scope and spirit. In particular, any of a variety of microprocessors and other combinations of hardware and computer programs could be used to accomplish the results desired. In addition, although the foregoing detailed description has been oriented toward the "turn-on" transient characteristics of a transmitter, those skilled in the art will appreciate that a transmitter can exhibit transient characteristics elsewhere during the duration of its transmissions, including termination of the transmission. Accordingly, the spirit and scope of the present invention are to be limited only by the following claims.

I claim:

1. Apparatus for determining transient characteristics of a radio transmitter that transmits a transient signal, comprising:
   means for receiving the transient signal transmitted by the transmitter;
   means for measuring the signal phase of the transient signal with respect to a predetermined frequency; and
   means for analyzing the signal phase of the transient signal to determine transient characteristics of the radio transmitter.

2. The apparatus of claim 1 wherein the means for analyzing the transient signal phase includes a digital filter.

3. Apparatus for determining transient characteristics of a radio transmitter than transmits a transient signal, comprising:
   means for receiving the transient signal transmitted by the transmitter;
   means for measuring the difference between instantaneous frequency of the transient signal and a predetermined frequency; and
   means for analyzing the frequency difference to determine transient characteristics of the radio transmitter.

4. The apparatus of claim 3 wherein the means for analyzing the transient parameter includes a microprocessor programmed to perform a digital filter operation.

5. The apparatus of claim 4 wherein the means for analyzing the transient signal parameter further includes a microprocessor programmed to determine a final frequency value, a natural period, and a damping factor of the phase of the transient signal from the difference between the instantaneous frequency of the signal and the predetermined frequency.

6. Apparatus for determining transient characteristics of a radio transmitter that transmits a transient signal during an extreme portion of a transmission, comprising:
   means for receiving the transient signal transmitted by the transmitter for a period of time including the extreme portion of the transmission;
   means for measuring the signal phase with respect to a predetermined frequency during the period of time; and
   means for analyzing the signal phase to determine transient characteristics of the radio transmitter.

7. The apparatus of claim 6 wherein the means for analyzing the transient signal phase includes a microprocessor programmed to perform a digital filter operation.

8. Apparatus for determining transient characteristics of a radio transmitter that transmits a transient signal during an extreme portion of a transmission, comprising:
   means for receiving the transient signal transmitted by the transmitter for a period of time including the extreme portion of the transmission;
   means for measuring the difference between instantaneous frequency of the signal and a predetermined frequency during the period of time; and
   means for analyzing the frequency difference to determine transient characteristics of the radio transmitter.

9. The apparatus of claim 8 wherein the means for analyzing the transient parameter includes a microprocessor programmed to perform a digital filter operation.

10. The apparatus of claim 9 wherein the means for analyzing the transient signal parameter further includes a microprocessor programmed to determine a final frequency value, a natural period, and a damping factor of the phase of the transient signal from the difference between the instantaneous frequency of the signal and the predetermined frequency.

11. Apparatus for determining transient characteristics of a radio transmitter after it is turned on, the radio transmitter operating substantially at a predetermined frequency, comprising:
    means for receiving a transient signal transmitted by the transmitter for a predetermined period of time beginning when the radio transmitter is turned on;
    a frequency discriminator for measuring the phase response of the transient signal with respect to the predetermined frequency during the predetermined period of time; and
    means for analyzing the transient signal phase to determine turn-on transient characteristics of the radio transmitter.

12. The apparatus of claim 11 wherein the means for analyzing the transient signal phase includes a microprocessor programmed to perform a digital filter operation.

13. The apparatus of claim 12 wherein the means for analyzing the transient signal phase further includes a microprocessor programmed to determine a final frequency value, a natural period, and a damping factor of the transient signal from the difference between the instantaneous frequency of the signal and the predetermined frequency.

14. Apparatus for determining transient characteristics of a frequency-modulated radio transmitter after it is turned on, the radio transmitter operating substantially at a predetermined carrier frequency, comprising:
    means for receiving a transient signal transmitted by the transmitter for a predetermined period of time beginning when the radio transmitter is turned on and producing a transient phase signal representative of the phase of the transient signal with respect to the predetermined carrier frequency during the predetermined period of time;

means for detecting the predetermined carrier frequency in the transient signal and producing a start signal in response thereto;

means for sampling the transient phase signal for the predetermined period of time in response to the start signal;

storage means for storing data; and microprocessor means for analyzing the samples of the transient phase signal to determine characteristic data of the turn-on transients of the radio transmitter and for storing the characteristic data in the storage means.

15. A method for determining transient characteristics of a radio transmitter that transmits a transient signal, comprising the steps of:
   (a) receiving the transient signal transmitted by the transmitter for a period of time;
   (b) passing the transient signal through a frequency discriminator; and
   (c) analyzing the frequency-discriminated transient signal to determine transient characteristics of the radio transmitter.

16. A method for determining transient characteristics of a radio transmitter that transmits a transient signal, comprising the steps of:
   (a) receiving the transient signal transmitted by the transmitter for a period of time;
   (b) measuring a parameter of the transient signal; and
   (c) sampling the phase of the transient signal and digitally filtering the samples to determine transient characteristics of the radio transmitter.

17. The method of claim 16 wherein step (c) further comprises determining a frequency value, a natural period and a damping factor of the phase of the transient signal.

18. Apparatus for determining transient characteristics of a frequency-modulated radio transmitter that transmits a transient signal after it is turned on, the radio transmitter operating substantially at a predetermined carrier frequency, the apparatus comprising:

means for receiving the transient signal transmitted by the transmitter for a period of time beginning when the radio transmitter is turned on and producing a signal representative of the difference between instantaneous frequency of the signal and a predetermined frequency during the period of time;

means for detecting the frequency difference represented by the frequency difference signal and producing a start signal in response thereto;

means for sampling the frequency difference signal in response to the start signal;

storage means for storing the parametric signal samples; and microprocessor means for analyzing the frequency difference signal samples to determine characteristic data of the turn-on transients of the radio transmitter and for storing the characteristic data in the storage means.

19. The apparatus of claim 18 wherein the microprocessor is programmed to perform a digital filter operation.

20. The apparatus of claim 19 wherein the microprocessor is further programmed to determine a final frequency value, a natural period, and a damping factor of the phase of the transient signal from the difference between the instantaneous frequency of the signal and the predetermined frequency.

* * * * *

UNITED STATES PATENT AND TRADEMARK OFFICE
CERTIFICATE OF CORRECTION

PATENT NO. : 5,005,210

DATED : April 2, 1991

INVENTOR(S) : Philip J. Ferrell

It is certified that error appears in the above-identified patent and that said Letters Patent is hereby corrected as shown below:

Column 9, claim 3, line 41, please delete "than" and substitute therefor --that--.

Signed and Sealed this

Twenty-fifth Day of August, 1992

Attest:

DOUGLAS B. COMER

*Attesting Officer*   Acting Commissioner of Patents and Trademarks